United States Patent
Decker et al.

(10) Patent No.: US 10,845,266 B2
(45) Date of Patent: Nov. 24, 2020

(54) QUICK LEAK DETECTION ON DIMENSIONALLY STABLE/SLACK PACKAGING WITHOUT THE ADDITION OF TEST GAS

(71) Applicant: Inficon GMBH, Cologne (DE)

(72) Inventors: Silvio Decker, Cologne (DE); Daniel Wetzig, Cologne (DE); Hjalmar Bruhns, Bonn (DE); Stefan Mebus, Cologne (DE)

(73) Assignee: Inficon GMBH, Cologne (DE)

( * ) Notice: Subject to any disclaimer, the term of this patent is extended or adjusted under 35 U.S.C. 154(b) by 0 days.

(21) Appl. No.: 16/243,513

(22) Filed: Jan. 9, 2019

(65) Prior Publication Data

US 2019/0145852 A1    May 16, 2019

Related U.S. Application Data

(63) Continuation-in-part of application No. 14/357,973, filed as application No. PCT/EP2012/071133 on Oct. 25, 2012, now abandoned.

(30) Foreign Application Priority Data

Nov. 16, 2011 (DE) .......................... 10 2011 086 486

(51) Int. Cl.
*G01M 3/32*        (2006.01)
(52) U.S. Cl.
CPC ........ *G01M 3/3209* (2013.01); *G01M 3/3218* (2013.01)
(58) Field of Classification Search
CPC ........................... G01M 3/3209; G01M 3/3218
(Continued)

(56) References Cited

U.S. PATENT DOCUMENTS

| | | |
|---|---|---|
| 4,287,250 A | 9/1981 | Rudy |
| 4,656,866 A | 4/1987 | Aarts |

(Continued)

FOREIGN PATENT DOCUMENTS

| | | |
|---|---|---|
| DE | 19722262 A1 | 12/1998 |
| DE | 19846800 A1 | 4/2000 |

(Continued)

OTHER PUBLICATIONS

European Patent Office, International Search Report for Corresponding International Application No. PCT/EP2012/071133, dated Jun. 28, 2013 in the German and English languages (7 pgs).

*Primary Examiner* — John Fitzgerald
*Assistant Examiner* — Rodney T Frank
(74) *Attorney, Agent, or Firm* — Harris Beach PLLC

(57) ABSTRACT

A method for leak detection of a test specimen includes providing an evacuable film test chamber which is operatively coupled to a pressure measuring device, and at least one processor operatively coupled to the pressure measuring device; measuring a pressure within the evacuable film test chamber by the pressure measuring device at predetermined times during a measurement period of time; calculating by the processor, a first or higher order derivative of a pressure change with respect to time at a first predetermined time, and a first or higher order derivative of a pressure change with respect to time at least at a second predetermined time during the measurement period of time, to provide at least a pair of derivative values; and categorizing by the processor a leaky or tight state of the specimen under test by a pattern recognition process based on the pair of derivative values.

12 Claims, 8 Drawing Sheets

(58) Field of Classification Search
USPC .................................................... 73/40
See application file for complete search history.

(56) References Cited

U.S. PATENT DOCUMENTS

| | | |
|---|---|---|
| 5,142,143 A | 8/1992 | Fite et al. |
| 5,279,163 A | 1/1994 | D'Antonio et al. |
| 5,385,139 A | 1/1995 | Corn |
| 5,513,516 A | 5/1996 | Stauffer |
| 6,412,894 B1 | 7/2002 | Askren et al. |
| 6,732,571 B1 | 5/2004 | Flosbach |
| 6,857,307 B2 | 2/2005 | Gebele et al. |
| 8,800,351 B2 | 8/2014 | Gunther et al. |
| 2005/0109082 A1 | 5/2005 | Stewart et al. |
| 2007/0265743 A1 | 11/2007 | Kojitani et al. |
| 2012/0261569 A1 | 10/2012 | Grosse Bley et al. |
| 2013/0130262 A1 | 5/2013 | Battrell et al. |

FOREIGN PATENT DOCUMENTS

| | | |
|---|---|---|
| DE | 102009059824 A1 | 6/2011 |
| EP | 0152981 A1 | 8/1985 |
| EP | 0741288 A1 | 11/1996 |
| GB | 840294 A | 7/1960 |
| JP | S62112027 A | 5/1987 |
| JP | H07318451 A | 12/1995 |
| JP | 2002022748 A | 1/2002 |
| JP | 2007327937 A | 12/2007 |
| JP | 2009276309 A | 11/2009 |
| RU | 2213333 C2 | 9/2003 |
| WO | WO-2007053246 A1 | 5/2007 |
| WO | WO-2011076459 A1 | 6/2011 |

QUICK LEAK DETECTION ON DIMENSIONALLY STABLE/SLACK PACKAGING WITHOUT THE ADDITION OF TEST GAS

CROSS-REFERENCE TO RELATED APPLICATIONS

This application is a continuation in part of and claims priority to and the benefit of co-pending U.S. patent application Ser. No. 14/357,973, QUICK LEAK DETECTION ON DIMENSIONALLY STABLE/SLACK PACKAGING WITHOUT THE ADDITION OF TEST GAS, filed May 13, 2014, PCT/EP2012/071133, filed Oct. 25, 2012, and DE 102011086486.5, filed Nov. 16, 2011, all of which applications are incorporated herein by reference in its entirety.

FIELD OF THE APPLICATION

The application relates to a device for leak detection on a test specimen.

BACKGROUND

Conventionally, leaks in a test specimen, e.g. a food package, are measured by placing the test specimen in a rigid test chamber. Thereafter, the test chamber is evacuated and a measurement of the pressure progression in the chamber after the disengagement of the chamber from the pump is performed. If the test specimen has a leak, gas escapes from the test specimen into the chamber, whereby the pressure in the test chamber rises.

SUMMARY

According to one aspect, a method for leak detection of a test specimen includes providing an evacuable film test chamber having at least one wall area of a flexible material, the evacuable film test chamber operatively coupled to a pressure measuring device, and at least one or more processors operatively coupled to the pressure measuring device, the at least one or more processors programmed to control components of the evacuable film test chamber and to perform a pattern recognition process, and a specimen disposed within the evacuable film test chamber; evacuating the evacuable film test chamber; measuring a pressure within the evacuable film test chamber by the pressure measuring device at predetermined times during a measurement period of time; calculating by the at least one or more processors, a first or higher order derivative of a pressure change at a first predetermined time, and a first or higher order derivative of a pressure change at least at a second predetermined time during the measurement period of time, to provide at least a pair of derivative values; and categorizing by the at least one or more processors a leak state of the specimen under test by the pattern recognition process based on the pair of derivative values, as either a tight specimen which is substantially not leaking, or as a leaky specimen which is leaking.

In one embodiment, the step of calculating a derivative includes a first derivative or slope at the first predetermined time and at the second predetermined time.

In another embodiment, the step of calculating a derivative includes a second or higher order derivative of pressure change with time at the first predetermined time and at the second predetermined time.

In yet another embodiment, the step of measuring further includes making a course leak detection measurement by measuring the pressure inside the evacuable film test chamber during a pump-off phase.

In yet another embodiment, the step of providing includes providing the evacuable film test chamber having a gas-binding absorber material disposed within a volume connected to the evacuable film test chamber.

In yet another embodiment, the gas-binding absorber material includes a zeolith.

In yet another embodiment, the gas-binding absorber material is disposed within a connecting channel between the evacuable film test chamber and the pressure measuring device.

In yet another embodiment, the method further includes a shut-off valve disposed in the connecting channel, the shut-off valve providing a selectable separation of the gas-binding absorber material from the volume of the evacuable film test chamber.

In yet another embodiment, the pattern recognition process includes a recognition of points within a leaky region or a tight region of a graph space.

In yet another embodiment, the pattern recognition process includes a linear discriminant analysis (LDA) process.

In yet another embodiment, at least one discriminant function is defined by a series of characteristic variables measured during a training or teach in series of measurements.

In yet another embodiment, the series of characteristic variables include a derivative of first or higher order of the pressure change with respect to time at the first and the second predetermined time.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1A:
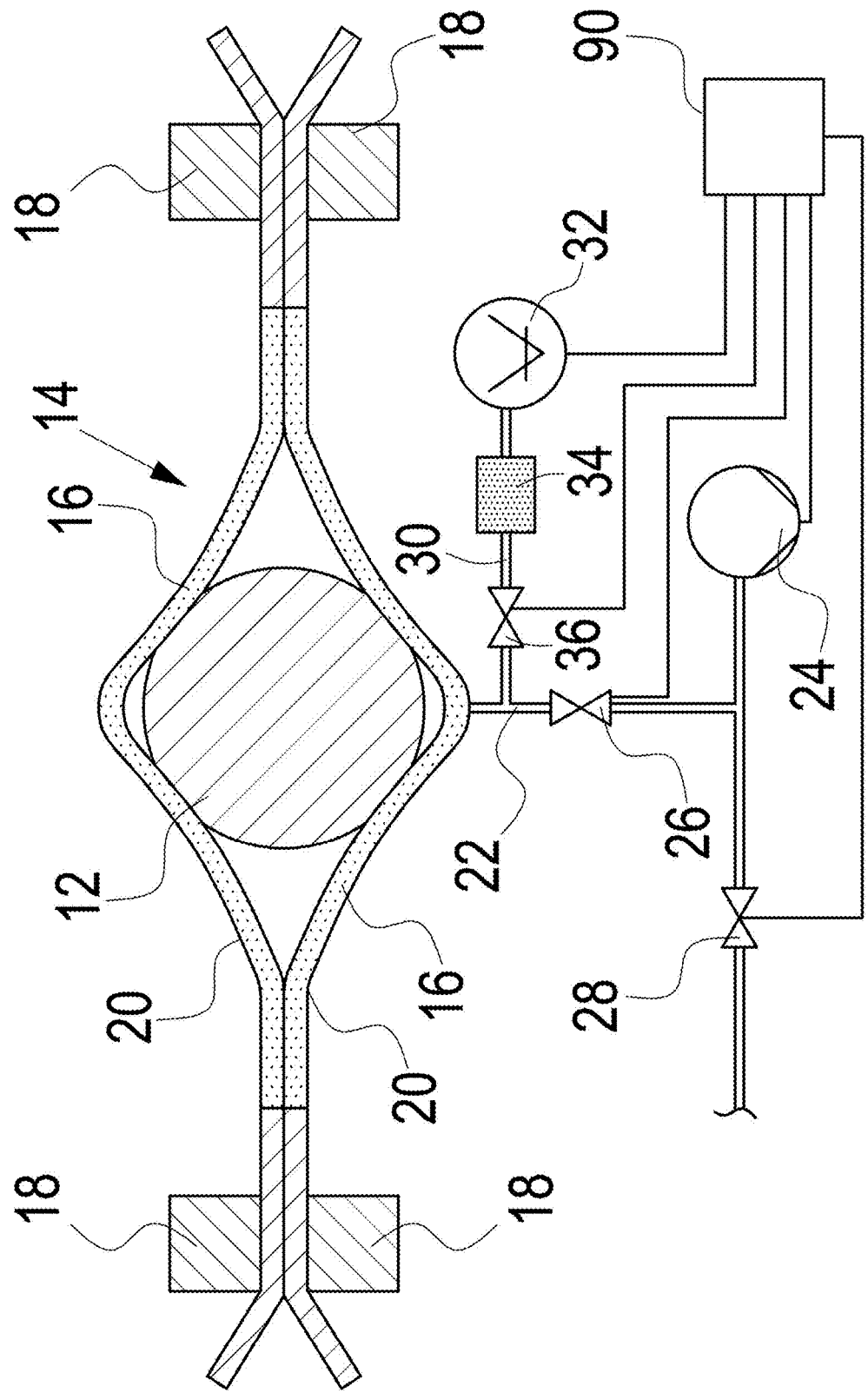
FIG. 1A is a schematic diagram showing a leak tester according to the Application.

It is one problem of the known leak detection method that the pressure inside the test chamber is not influenced exclusively by a leak in the test specimen, but also by temperature variations in the test chamber or by desorption of gases on inner surfaces of the test chamber, whereby measuring errors occur in leak detection. These disturbing influences are the greater, the larger the volume of the test chamber is and the higher the pressure during the measurement is within the test chamber. For practical reasons, the volume of the test chamber cannot be reduced at will, since the shape, the size and the number of test specimens require a certain chamber volume. Further, it is not possible to reduce the pressure during the measurement in the test chamber at will, since there is a risk of the test specimen being deformed, damaged or even bursting, in particularly with soft, dimensionally instable test specimens such as packages, for example.

Further, test chambers are known in which at least one wall portion and preferably the entire test chamber is made from a flexible, preferably elastically deformable material, such as a film, for example. The flexible wall portion is formed in the region of the chamber where the test specimen is located during leakage measurement. As the pressure inside the test chamber is reduced, the flexible chamber wall clings to the test specimen, whereby the chamber volume is reduced. Thereby, influences interfering with the measurement, in particular pressure variations caused by temperature variations, are reduced. Moreover, the flexible wall portion clinging to the test specimen supports the test specimen and prevents the test specimen from being deformed or from even bursting. This is advantageous in particular with dimensionally instable test specimens, such as packages, for example.

Such film test chambers are described, for example, in JP-A 62-112027, EP 0 152 981 A1 and EP 0 741 288 B1. JP-A 62-112027 describes the detection of the escaping gas by means of a gas detector. EP 0 152 981 A1 describes an evacuation of the film chamber, wherein the pressure difference between the pressure in the film chamber and a reference pressure in a reference volume is observed. If this pressure difference deviates from zero, a leak is considered to have been detected. In EP 0 741 288 B1, a film chamber is pressurized, and the pressure is measured at a certain moment for the purpose of leak detection. When a threshold value is exceeded, a leak is considered to have been detected.

It is an object of the Application to provide a device for leak detection on a test specimen, which allows for quick leak detection. According to the device of the Application, leak detection is performed by measuring the total pressure increase of the pressure inside the test chamber.

The test for possible leaks is carried out without the aid of test gas. Here, a direct gas exchange between the test chamber and the total pressure sensor is not necessary, so that no gas has to flow from the leak to the pressure sensor.

In this context, total pressure is understood as the absolute pressure within the film test chamber. The term total pressure serves as a means of differentiation over the conventionally known leak detection techniques using the evaluation of a differential pressure. According to the Application, the progression of the total pressure increase is evaluated over the entire measuring interval, i. e. during the entire duration of the measurement. The shape of the pressure increase progression serves for a quick estimation on the existence of a leak. The progression of the pressure increase is more accurate than a mere monitoring of threshold values or a measuring of differential pressures. The quick evaluation of the progression of the total pressure increase enables a fully automated and particularly quick measuring cycle for implementation in fully automated leak detection operations.

Preferably, the test chamber is made of one or a plurality of flexible films, into or between which the test specimen is positioned. The film or the films may be connected and closed by means of clamping elements, such as clips, for example.

A gas-permeable material or a gas-permeable structure at an inner wall portion of the test chamber in the region of the test specimen allows for a gas flow around the test specimen, even after the flexible test chamber wall clings to the test specimen, whereby it is possible to evacuate the entire chamber volume further to a low total pressure.

Preferably, the pressure progression, i.e. the progression of the total pressure and, possibly, also the progression of the partial pressure of individual gas components is evaluated already during the pump-off phase of the measuring sequence, so as to allow for coarse leak detection.

Figure 11:
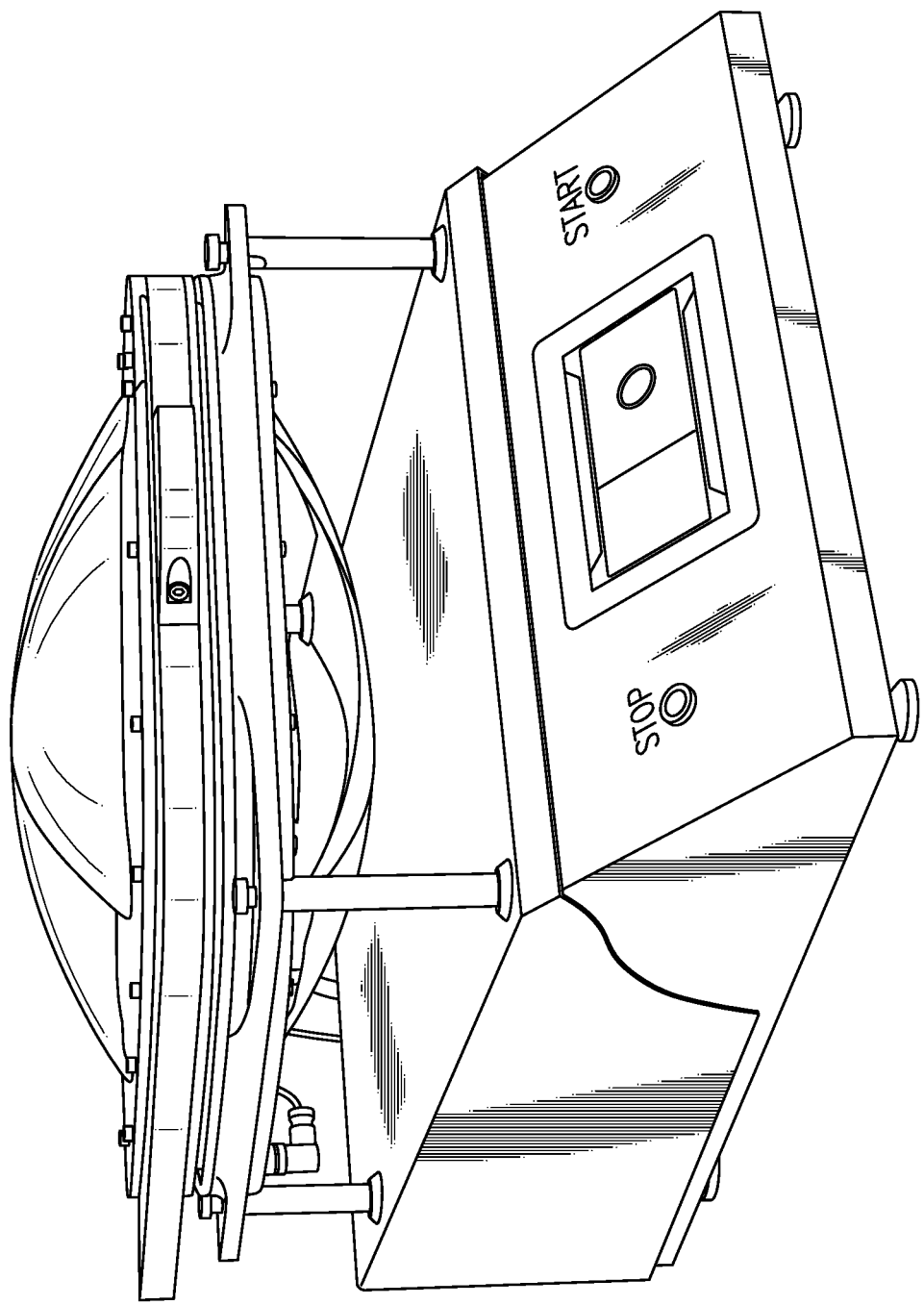
FIG. 11 is a drawing showing an exemplary leak detection device according to the Application.

It is advantageous if the test chamber is enclosed by an outer overpressure chamber (See for example, FIG. 11). For a preliminary removal of gas from the test chamber, it is possible to increase the pressure in the outer chamber relative to the pressure in the test chamber so that an external force acts on the flexible test chamber and the flexible region of the test chamber is caused to cling to the product. Thereby, a large part of the gas is expelled from the test chamber irrespective of the suction capacity of the pump employed. Thereby, the measuring cycle is much faster.

Preferably, a selectively gas-binding material is introduced as an absorber into the chamber or into a volume connected with the test chamber volume. The absorber material binds reactive gas that influences the pressure increase in the chamber by desorption and which could compromise the leakage rate measurement. The desorption of gases at the surfaces of the test chamber inner sides typically causes an additional increase in pressure and results in measuring errors in leakage rate measurement. Specifically, water in a pressure range of less than 10 mbar makes a major contribution to the total pressure increase by desorption. In total pressure measurement, the pressure increase in the test chamber caused by water cannot be differentiated from a pressure increase caused by a leak in the test specimen. The absorber material can reduce this measuring error.

Preferably, the absorber material is accommodated in a connecting channel between the test chamber and a pressure sensor, for example the total pressure sensor. In this case, the volume within the connecting channel, in which the absorber material is situated, should be adapted to be separated from the test chamber volume by a shut-off valve. During ventilation and during the pump-off phase, e.g. for coarse leak detection, when the valve is closed, the absorber material is not exposed to atmospheric gas and the capacity of the absorber material for selective gas binding is preserved.

Referring now to the exemplary embodiment of FIG. 1A, a test specimen 12 is placed in the chamber 14. Then, the chamber 14 is closed and is evacuated via a valve 26. Owing to the pressure drop in the chamber 14 and the accompanying external force exerted by atmospheric pressure, the flexible chamber wall 16 clings to the entire test specimen 12 and adapts to the outer shape thereof.

A gas permeable material of a nonwoven fabric 20 is provided between the chamber foil 16 and the test specimen 12. As an alternative, the surface of the films 16 can be structured. This enables a gas flow around the test specimen 12 also after the film chamber 14 clings to the test specimen 12, and thus enables further evacuation of the entire chamber volume to a low total pressure.

A vacuum is generated between the film 16 and the test specimen 12, typically in the range from 1 to 50 mbar absolute pressure, corresponding to the chamber pressure of a rigid test chamber. Despite the vacuum around the package 12, no force is effectively exerted on the same, since the internal pressure of the test specimen 12 and the external pressure on the flexible chamber material are identical. Thus, the film 16 uniformly supports the package on all sides and prevents the same from distending or from being destroyed.

The intermediate space filled with nonwoven 20 forms the free volume which typically has a size of only a few cm³. Due to the film chamber's 14 adaptation to the shape of the test specimen 12, a minimum chamber volume is reached even when different test specimens are used.

A leak in the test specimen 12 leads to a continuous total pressure increase in the film chamber 14 after the same has been separated from the pump 24 by means of the valve 26. This total pressure is determined by total pressure measurement using a sensitive total pressure measuring device (vacuum meter).

The pressure progression during the accumulation phase is evaluated and is compared with set values. If a corresponding deviation from set values occurs, a leak in the test specimen 12 is detected.

$$\frac{\Delta p_{chamber}}{\Delta t} = \frac{q_p}{V_{chamber}} \tag{1}$$

$$q_p \propto \left(\frac{P_{test\ specimen}}{P_{chamber}}\right)^2 \tag{2}$$

$\frac{\Delta p_{chamber}}{\Delta t}$: pressure variation $\Delta p_{chamber}$ in the test chamber per time period $\Delta t$ $V_{Chamber}$: chamber volume [l]

$q_P$: leakage rate [mbar l/s]

$p_{chamber}$, $p_{test\ specimen}$: pressure in chamber or test specimen, resp., [mbar]

Both the total pressure increase, and the partial pressure increase in the measuring chamber, depend on two values: the prevailing chamber pressure and the measuring volume.

A total pressure measurement has two advantages over a test gas detection of a test gas introduced into a package, which advantages will be explained below:

first, there is no dependence on the type of gas, i.e. no special test gas has to be supplied to the product for leak detection, second, a total pressure variation can be detected immediately anywhere in the test volume. Owing to the principles involved, a sensor system specific to a certain test gas has a diffusion-dependent response time, since the test gas to be detected has to get from the leak to the sensor in order to be detected. Depending on the distance and the total pressure, the diffusion time may be inacceptable for the cycle times intended.

Because of these connections, it is feasible to measure the pressure increase in a very small, free chamber volume, at low chamber pressure and without test gas.

The measuring error caused by temperature variations:

The lower the total pressure in the test chamber is, the higher is the leakage rate from the test specimen and thus the pressure increase to be expected. Further, the total pressure in the test chamber depends on the mean temperature $T_{chamber}$ of the gas. In a first approximation, the following is valid:

$$p_{chamber} = \frac{R \cdot T_{chamber}}{V_{chamber}} \tag{3}$$

Through an error estimation, the following result is obtained therefrom:

$$|\Delta p_{chamber}| = \left|p_{chamber} \cdot \frac{\Delta T_{chamber}}{T_{chamber}}\right| + \left|p_{chamber} \cdot \frac{\Delta V_{chamber}}{V_{chamber}}\right| \tag{4}$$

$|\Delta p_{chamber}|$ is the variation of the pressure due to variations of the temperature and the chamber volume. The pressure variation cannot be differentiated from a pressure variation caused by leaks in the test specimen. The pressure variation $|\Delta p_{chamber}|$ caused by a temperature variation is proportional to the chamber pressure $p_{chamber}$. The lower the chamber pressure, the smaller this disturbing influence.

Example: At a chamber pressure of 700 mbar, a temperature variation by 0.1 K at a chamber temperature of 25° C. (298.15 K) causes a pressure variation of $$|\Delta p_{chamber}| = 700\ \text{mbar} \cdot \frac{0,1\ K}{298,15\ K} = 0.234\ \text{mbar} \tag{5}$$

For comparison: Given a measuring time of 10 s and a free chamber volume of 0.1 l, a leakage of $q=1\times 10^{-3}$ mbar l/s leads to a pressure increase of:

$$|\Delta p_{chamber}| = \frac{q_p \cdot \Delta t}{V_{chamber}} = \frac{1 \times 10^{-3} \frac{\text{mbar} \cdot \text{l}}{\text{s}} \cdot 10[s]}{0,1\ \text{l}} = 0.1\ \text{mbar} \tag{6}$$

In this case, the pressure increase caused by temperature variation would be twice the increase caused by the leakage. If one would operate at 7 mbar instead, the pressure variation caused by the temperature variation would only be 0.01 mbar which corresponds to a proportion of merely ~5% of still the same measuring signal. That is, the same leak that is masked by the temperature variation at 700 mbar total pressure can be measured at 7 mbar. The thermal expansion caused by a temperature drift and the accompanying change in the chamber volume is negligible relative to the direct influence of a temperature variation on the chamber pressure.

Temperature variations can be expected during leak measurement, since, on the one hand, the pressure variation and the accompanying compression/expansion of the gas cause temperature variations and, on the other hand, the test specimens often have a temperature differing from that of the measuring chamber.

The influence of the volume on the measurement:

The pressure variation caused by leaks in the test specimen is the greater, the smaller the free chamber volume—and thus the measuring volume—is. In this context, the free chamber volume is the volume which in the evacuated state of the chamber is not occupied by the test specimen.

Example: In a typical chamber with a free volume of one liter, a leak of the size q=1×10⁻³ mbar l/s causes a pressure increase of ca. 0.01 mbar during 10 s. With a free chamber volume of 10 cm³, the same is about 1 mbar.

Desorption:

The desorption of, for instance, water also influences the total pressure in the test chamber. With consideration to desorption, the following connection is determined for the total pressure increase within the test chamber:

$$\frac{dp}{dt} = \frac{dp_L}{dt} + \frac{dp_T}{dt} + \frac{dp_D}{dt}$$

$$\frac{dp_L}{dt} = \frac{q_L}{V_R}$$

$$\frac{dp_D}{dt} = \frac{A_R}{V_R} \cdot q_A$$

$\frac{dp}{dt}$: total pressure increase [mbar/s]

$\frac{dp_L}{dt}$: total pressure increase caused by leak [mbar/s]

$\frac{dp_T}{dt}$: total pressure variation caused by temperature drift [mbar/s]

$\frac{dp_D}{dt}$: total pressure increased caused by desorption $V_R$: volume of recipient [l]

$A_R$: surface area of recipient+test specimen [cm²]

$q_L$: leakage rate of test specimen [mbar l/s]

$q_A$: desorption rate of chamber/test specimen [(mbar l)/(s cm²)]

For a sensitive leakage rate measurement over the temporal progression of the total pressure in an accumulation chamber, a minimum possible chamber volume should be aimed at. The smaller the chamber volume, the faster the total pressure rises for a given fixed leakage rate.

In order to achieve the smallest possible total pressure increase caused by desorption in a chamber, a large ratio of volume to surface area should be aimed at. The larger the chamber volume is for a given surface area, the lower the total pressure increase is per unit time.

This forms a contradiction. This contradiction may be resolved by removing the influence of the partial pressure of water by providing an absorber material preferably in a connecting channel between the test chamber and the total pressure measuring device.

The special feature of the invention is that a chamber of a formable and flexible, e.g. elastic material is used, with the total pressure increase in such a sealed chamber being used to measure the leakage. The measuring of the total pressure is effected by measuring the active force per surface area, e.g. using a capacitive total pressure sensor. Here, a test for possible leaks is performed without the aid of test gas. Further, a direct gas exchange between the film chamber and the total pressure sensor is not required. Thus, the gas does not have to flow from the leak to the total pressure sensor.

The test chamber itself may be constituted by a single film or a plurality of films. The special feature of this measuring method is that the contradiction between the smallest volume and the lowest working pressure is resolved while simultaneously protecting the test specimen. Further, owing to the detection by means of the total pressure measurement, no supply of gas from the leak to the sensor is required.

Summarizing, the following problems are solved thereby:

The contradiction between a low working pressure and a simultaneous protection of the test specimen is resolved.

The low working pressure that can be reached significantly reduces the temperature drift and increases the measurable leakage rate.

Owing to the small volume, the pressure increase in the chamber caused by a leak becomes maximal and so does the measuring signal.

Due to the self-minimizing volume, the chamber is evacuated much faster.

No gas flow has to exist between the leak and the total pressure sensor.

Figure 2:
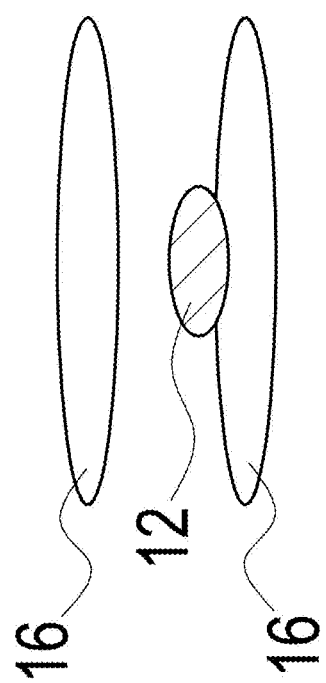
FIG. 2 is a schematic illustration of the test chamber of the first embodiment in an open state.

As illustrated in FIG. 1A, a test specimen 12 in the form of a soft food package is placed into a test chamber 14 formed by a film 16. As illustrated in FIG. 2, the film 16 is formed by two separate film sections between which the test specimen 12 is laid so that the test specimen 12 is entirely enclosed by the two film sections.

FIG. 1A shows that the superimposed edge portions of the two film sections are pressed onto each other by means of clips 18 so that no gas can escape out of the test chamber 14 from between the film sections.

On the inner side of the film 16, a layer of nonwoven is provided that encloses the test specimen 12 and enables a gas flow between the test specimen 12 and the film 16, in order to be able to achieve a complete evacuation of the test chamber 14 even when the film 16 clings tightly to the test specimen 12.

The test chamber 14 is connected to a vacuum pump 24 through a connecting channel 22. A shut-off valve 26 is situated in the connecting channel 22 between the vacuum pump 24 and the test chamber 14, the valve serving to separate the test chamber volume from the vacuum pump 24. Between the shut-off valve 26 and the vacuum pump 24, a ventilation valve 28 is provided for ventilating the test chamber 14.

From the connecting channel 22, a further connecting channel 30 branches off between the test chamber 14 and the shut-off valve 26, which connects the test chamber volume with the pressure sensor of a total pressure measuring device 32. An absorber 34 is provided in the connecting channel 30 and a shut-off valve 36 is provided between the absorber 34 and the test chamber 14. When the shut-off valve 36 is open, the absorber material of the absorber 34 is connected with the test chamber volume. The absorber material preferably is water-absorbing zeolith, so as to reduce the effect of water desorption at the inner wall regions of the test chamber 14. Upon evacuation of the test chamber 14 and/or upon ventilation of the test chamber 14, the shut-off valve 36 is closed in order to preserve the absorption capacity of the absorber 34.

Any suitable pressure measuring device can be used for the pressure sensor of a total pressure measuring device 32. Suitable pressure measuring devices include, for example, a membrane manometer, a gas heat conductance manometer (Pirani sensor), or a partial pressure sensor (e.g. a $CO_2$ detector) under a precondition that the gas composition remains unchanged during the measurement so that the total pressure will change in proportion to the measured partial pressure.

FIG. 1A shows an exemplary computer including a processor 90 operatively coupled to total pressure measuring device 32, shut-off valve 26, shut-off valve 36, ventilation valve 28, and vacuum pump 24. Computer with processor 90 is a processor based device and can run the measuring process, and either transmit measured data to another computer, or process the data directly. Computer with processor 90 can be any suitable microcomputer, computer, controller, laptop computer, desktop computer, etc. and is understood to include at least one non-volatile memory. Both of the measurement process and data analysis process (e.g. pattern recognition by LDA) can be carried out by running any suitable firmware or software from any suitable non-volatile memory within the computer or other operatively coupled to processor 90 (non-volatile memory not shown in FIG. 1A).

Figure 1B:
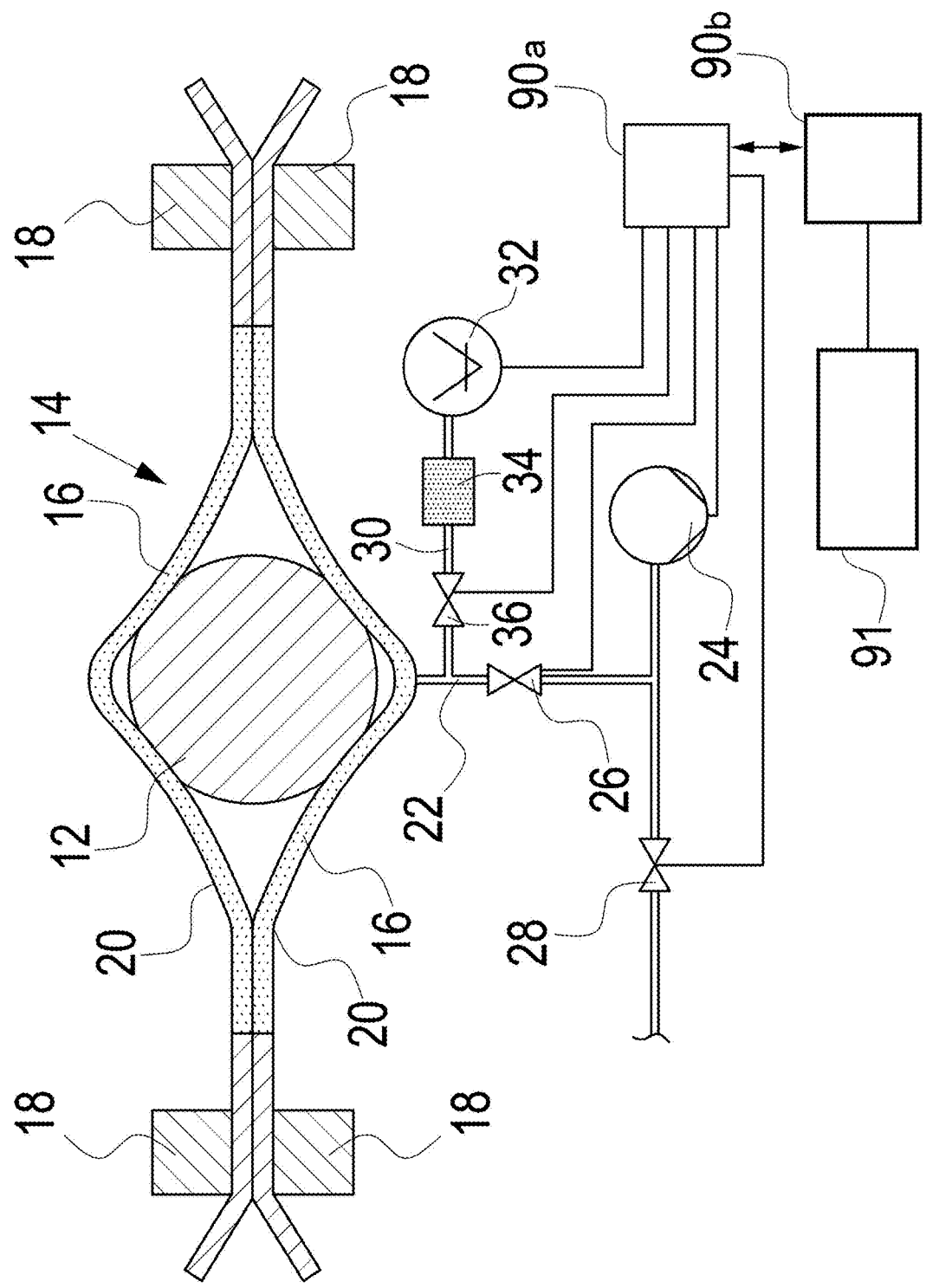
FIG. 1B is a schematic diagram a leak tester according to FIG. 1A, having both an embedded processor and another processor with a display.

FIG. 1B is a schematic diagram a leak tester according to FIG. 1A, with both an embedded processor and another processor with a display. In this exemplary embodiment, the first processor 90a of the embedded controller performs the basic steps of pump and valve control and receiving data from the pressure measurement device, while the second processor 90b provides a graphical user interface (GUI) on the display 91 and performs the pattern recognition process. It is unimportant specifically how any of the processes are performed by at least one or more processors (e.g. processor 90, FIG. 1A, or Processors 90a, 90b, FIG. 1B), or how the various processes are divided between the at least one or more processors.

In the exemplary embodiment FIG. 1B, valve control and sensor interface are accomplished through a first processor 90a of an embedded controller. Any suitable embedded controller, such as, for example, a programmable logic controller (PLC) can be used as the embedded controller. The exact type of embedded controller is unimportant, and any suitable microcomputer based board can be used for example, in place of a PLC. In the exemplary implementation of FIG. 1B, data analysis (e.g. pattern recognition by LDA) can be performed in a second computer having its own one or more processors, the second computer having the processor 90b operatively coupled to the embedded controller. The computer or controller with processor 90a and computer with processor 90b each can be any suitable microcomputer, computer, controller, embedded controller, programmable logic controller, laptop computer, desktop computer, etc. which each typically includes at least one non-volatile memory (not shown in FIG. 1B). Both of the measurement process and data analysis process (e.g. pattern recognition by LDA) can be carried out by running any suitable firmware or software from any suitable non-volatile memory, typically, but not necessarily, run on processor 90b where there are two processors.

A display 91 of the second computer including processor 90b can be used to accept user input, such as, modes of operation, including the training and measurement modes. Results of training and/or a measurement test of a specific package following training for a given package type can be displayed on the second computer display 91. The display 91 can be a touch sensitive screen with soft buttons and/or there can be any suitable type and number of conventional buttons (e.g. start and stop buttons) and/or switches, or any combination thereof.

The training, measurement, and data analysis processes (described in more detail hereinbelow) can be performed by any suitable one of the at least one or more processors. Typically, there can be a processor 90a of a programmable logic controller to run the hardware components of the new device (e.g. valves and pumps) and a processor 90b of a computer to run the training, and analysis processes. However, the exact configuration of a single processor, embedded controller, second computer and/or second computer processor, etc. and which specific processor runs any given process, is unimportant to the new device of the Application.

Figure 3:
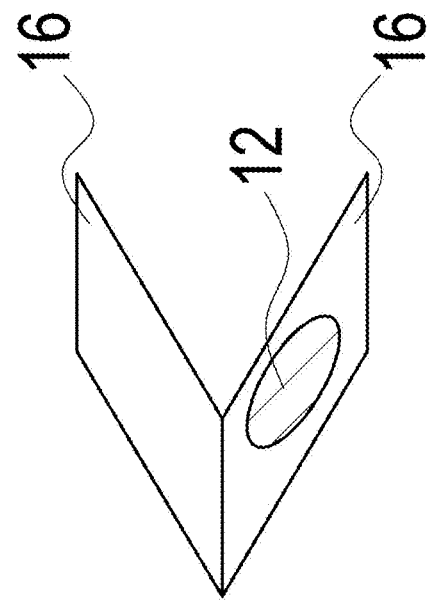
FIG. 3 shows a second embodiment in a view similar to FIG. 2.

FIG. 3 illustrates an exemplary embodiment in which the test chamber 14 is formed by a folded film. The test chamber 14 is closed by folding the film 16 around the test specimen 12.

Figure 4:
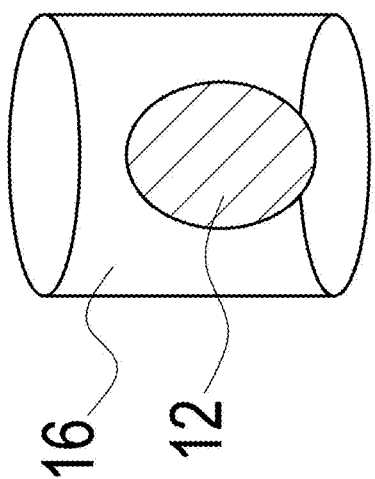
FIG. 4 shows a third embodiment in a view similar to FIG. 2.

In the exemplary embodiment in FIG. 4, the film 16 is a hose that is closed at its opposite ends in order to form the test chamber 14.

Figure 5:
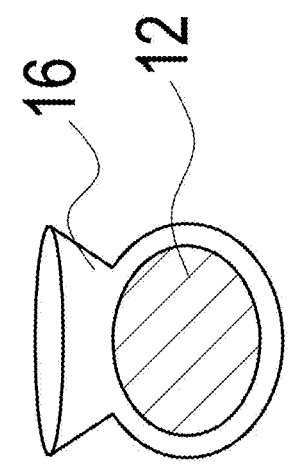
FIG. 5 shows a fourth embodiment in a view similar to FIG. 2.

In the exemplary embodiment in FIG. 5, the test chamber 14 is formed by a film 16 shaped in the manner of a sack-like balloon which holds the test specimen 12. The open end of the balloon can be closed, for example, by means of clips 18, as illustrated in FIG. 1, to close the test chamber 14.

Figure 6:
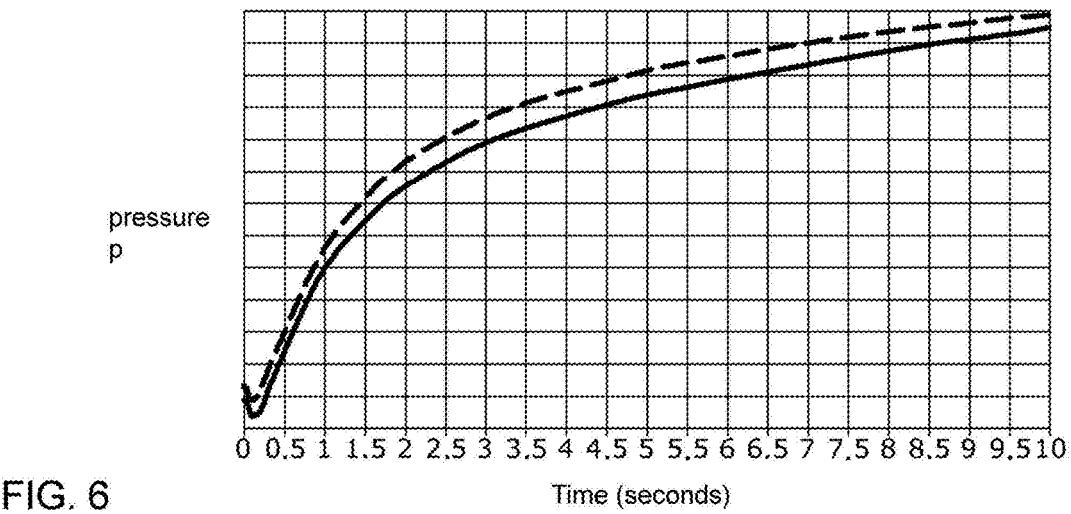
FIG. 6 shows an exemplary progression of the measured pressure.

FIG. 6 is a graph showing two exemplary curves of a pressure progression in the film chamber during two different measurements over a measuring interval of 10 s. Here, the dash-line curve is one measurement of a tight test specimen, while the continuous curve represents another measurement of a leaky test specimen. As illustrated in FIG. 6, the pressure increase (dp/dt, the slope of the curve at any particular time) can be larger for tight test specimens than for leaky test specimens over the entire measuring interval. Further, the pressure increase at a certain moment, i.e. the first derivation of the pressure progression with respect to time, can be larger for tight test specimens than for leaky ones. The reason for this is a difference in the degree of gas desorption from the film material and from the nonwoven, respectively. Under these preconditions it is possible that a single value, e.g. the pressure increase or the total pressure difference between the start and the end of the measuring interval, does not provide a clear reference for tight and leaky test specimens. This problem can be solved by a pattern recognition that refers to various curve properties such as the slope or the curvature at defined times, for example.

Figure 7:
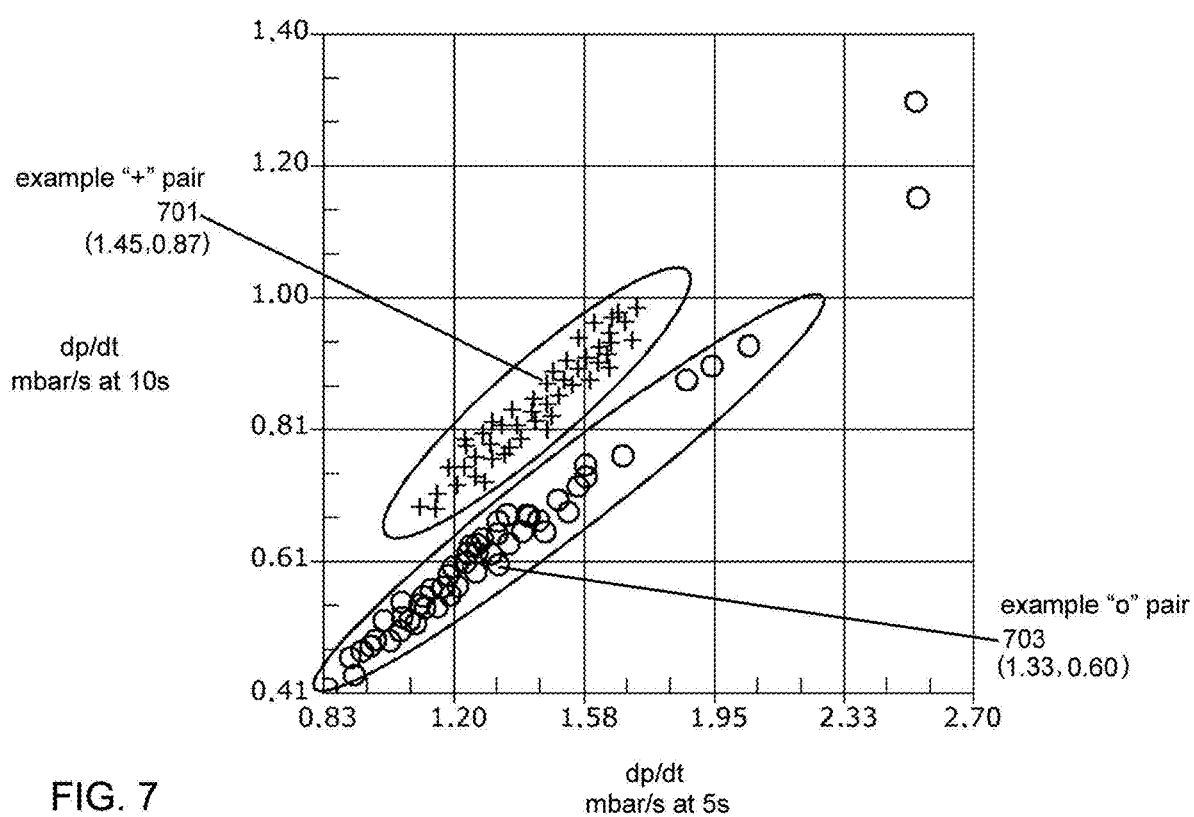
FIG. 7 is a graph showing an exemplary evaluation of the pressure increase (dp/dt) at two fixed times.

In the exemplary computer generated x-y graph of FIG. 7, values for the pressure increase after 10 s (end of measuring interval) and for the pressure increase after 5 s (half the measuring interval) are plotted. On the x-axis, the pressure increase values after half the measuring interval (5 s) are shown, and the pressure increase values at the end of the measuring interval (10 s) are plotted on the y-axis. A pattern recognition is used to detect groups of measuring values. Here, a first group is detected for the measuring values of the leaky test specimen, illustrated as crosses, and a second group is detected for the measuring values of the tight test specimen, illustrated as dots. The crosses in FIG. 7 represents the values of a test specimen classified as leaky. For an allocation or a classification of tight and leaky test specimens, mathematical methods of pattern recognition can be reverted to, such as, for example, LDA (Linear Discriminant Analysis).

Thus, while the pressure progression curves of FIG. 6 viewed as pressure over time alone do not apparently indicated which specimen is tight and which is leaking, it was found that properties of each of those curves, such as slope or curvature at particular times, can provide a reliable indication of which specimens are leaky and which are tight.

Now in more detail, the exemplary computer generated x-y graph of FIG. 7 shows the y-axis pressure increase (dp/dt) at 10 sec (y axis) plotted against the pressure increase (dp/dt) at 5 seconds (x axis), for many tens of test (training) measurement runs. Each symbol or point, both + (leaky) and circle (tight), represents a pair of the aforementioned values from each 10 second interval measurement of any particular package specimen. That is, the crosses "+" in FIG. 7 represents the values (x-y pairs) of test specimens classified as leaky, and the circles "o" in FIG. 7 represents the values (x-y pairs) of test specimens classified as tight".

In other words, each symbol or point of FIG. 7, both of + (leaky) and circle (tight), represents a different pair of values. In the example of FIG. 7, one value of the pair of values is (dp/dt) at 10 sec, and the other value of the pair of the values is (dp/dt) at 5 seconds.

In the exemplary graph of FIG. 7, the property of the curve considered at two different times, is dp/dt. For example, one + (leaky) symbol 701 can be seen at about (1.45, 0.87) and one circle (tight) symbol 703 can be seen at about (1.33, 0.60). There is no particular significance to the point 701 and the point 703, other than as exemplary points (each point representing a specific pair of values) to demonstrate how each different pair of values can be transformed to a point. The location of the points can then be interpreted, for example, by a pattern recognition to locate a region in an x-y graphic space, to determine if the particular pair of values of a property of a pressure curve in time represents a leaky or a tight specimen (e.g. a specific product package under leak test). Other properties, such as, for example, higher order derivatives can also be used. Higher order derivatives could replace the pairs of first derivatives, or higher order derivatives could be used to supplement differentiation of the tight and leaky conditions, such as where higher order derivatives are considered in addition to the pair of dp/dt values taken at two different times (e.g. at 5 s and 10 s, or any other suitable times can be used). Any suitable pattern recognition computer process can be used to so identify leaky and tight specimens by identifying where a point falls in a graphic region of an x-y graph space. For example, points can fall within a "leaky" graphical region or within a "tight" graphical region of the x-y graph space.

In summary, it was realized that in some embodiments, by considering the first derivative of the pressure (dp/dt, also called the "pressure increase") at each of two different times, and following a series of training runs, that tight and leaking specimens can be reliably identified later in a single measurement. Following a series of training runs, substantially non-overlapping regions show as patterns or as regions of the graph on the computer generated x-y graph of FIG. 7. Computer pattern recognition can be used to detect groups of measuring values. Here, a first group is detected for the measuring values of the leaky test specimen, illustrated as crosses, and a second group is detected for the measuring values of the tight test specimen, illustrated as dots.

It was also found that after a series of initial training runs of a number of samples of a particular type of package, by considering a property of the pressure curves at different times (e.g. dp/dt at two different times), that two substantially non-overlapping regions ("leaky" and "tight") can be identified. Following the training, a package can thus be identified by a single measurement, as falling into either of the two regions, leaky or tight (e.g. as shown by the exemplary ellipses of FIG. 7). The shape of the two regions is unimportant, the two regions need only be substantially non-overlapping for the particular property of the curve, such that a result for a single measurement of a specific package, leaky or tight, can be determined unambiguously.

The computer generated graph can automatically recognize where any single measurement falls within either of the two discrete groups of symbols by any suitable recognition process run by a processor. Following training for a particular product to be leak tested (typically a package), any suitable categorization process can be used to determine which region (leaky or tight) an individual measurement belongs in.

LDA—For example, LDA (Linear Discriminant Analysis) can be used for the pattern recognition. LDA has been described by Tharwat, et al. in *Linear discriminant analysis: A detailed tutorial*. See also, the wiki description of LDA, <https://en.wikipedia.org/wiki/Linear_discriminant_analysis>.

EXAMPLE—Property of the curve at different times

As described hereinabove, a leak test device according to the Application, can identify a tight or a leaky package following a single measurement.

Figure 8:
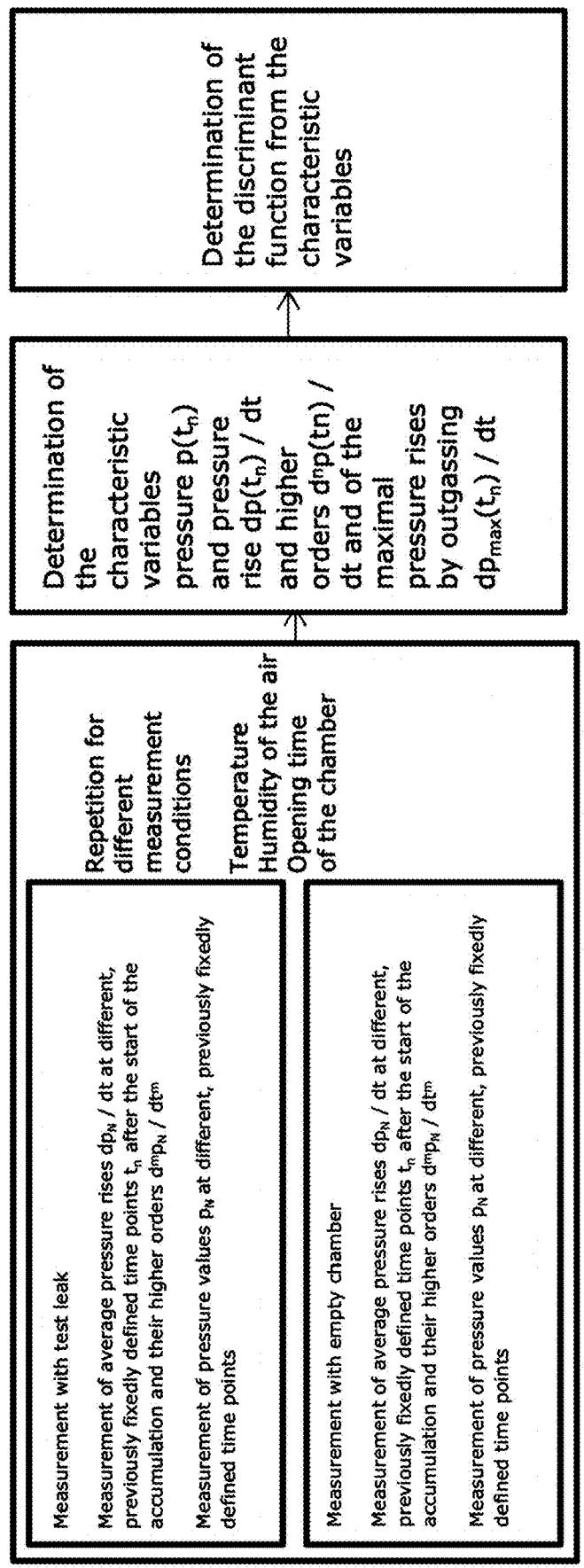
FIG. 8 shows a flow diagram of an exemplary teach in (training) process.

Step 1: "Teach-in" (training)—Before individual packages are leak tested, for a particular type of package, the leak test device is trained using leaky and tight specimens. FIG. 8 shows a flow diagram of an exemplary teach in process. The series of training measurements can be made, for example, for a range of expected measurement conditions, such as, for example, air temperature, humidity, and opening time of the chamber. The property or characteristics of the curve considered can be, for example, dp/dt at two different times, as described hereinabove, higher order derivatives, or any combination thereof. Following the training measurements of step 1, there can be a determination of an LDA discriminant function.

Figure 9:
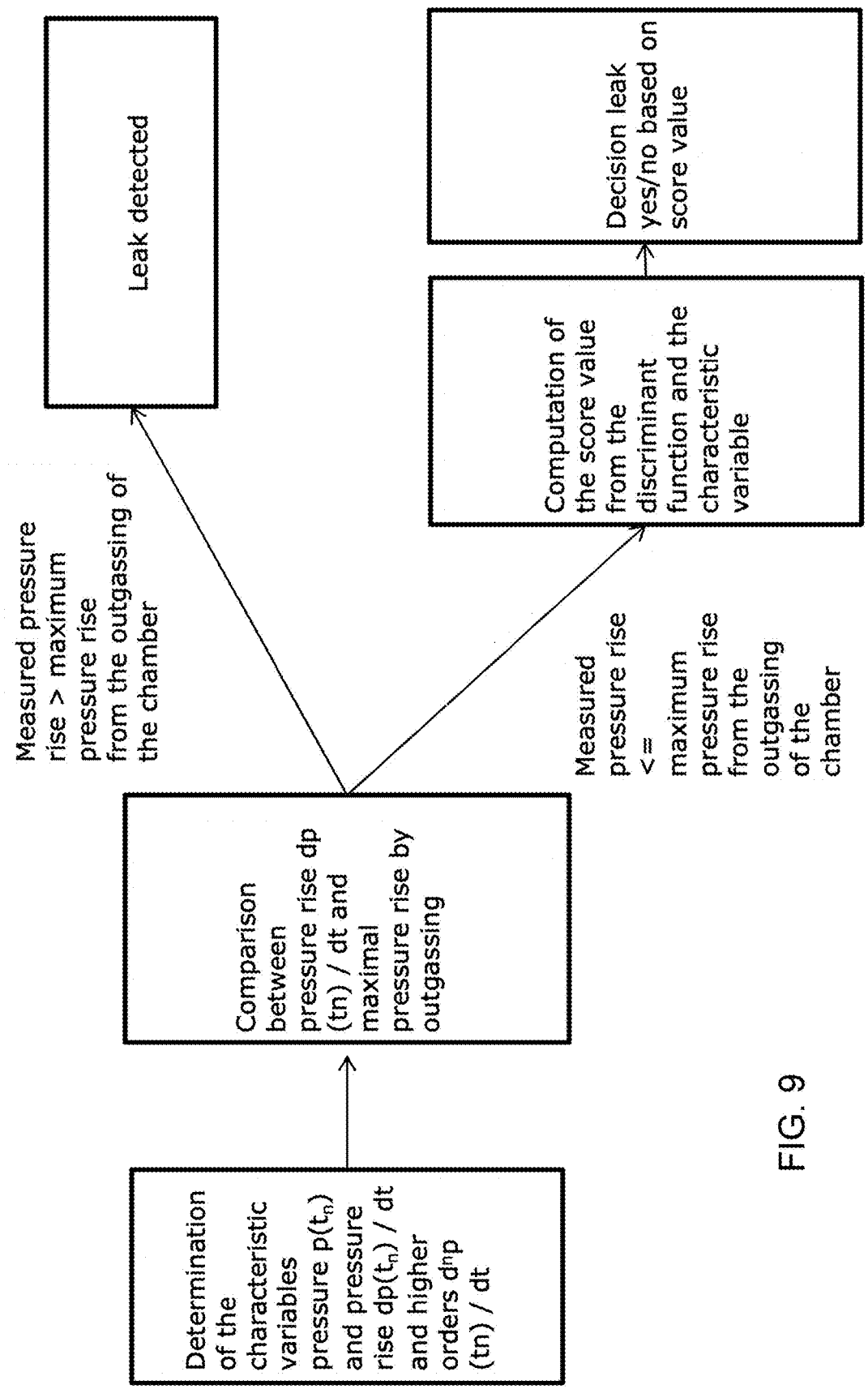
FIG. 9 shows a flow diagram of an exemplary measuring process.

Step 2: "Measuring"—Once the training of step 1 for any given type of package is complete, an individual package can be leak tested in a single measurement according to step 2. FIG. 9 shows a flow diagram of an exemplary measuring process. The measurement provides at least one pair of numbers, each number representing a property of the curve (e.g. dp/dt and/or a higher order derivative). A first rough determination can be based on a relatively large determinative leak condition, such as, for example, where a measured pressure rise is greater than a maximum pressure rise from an outgassing in the chamber. Such a gross condition provides a certain indication of a leak detection. However, where the measured pressure rise is less than or equal to a maximum pressure rise from the outgassing of the chamber, pattern recognition (here, LDA) based on the training regions defined by step 1 can be used to determine if the package is leaky or tight.

Figure 10:
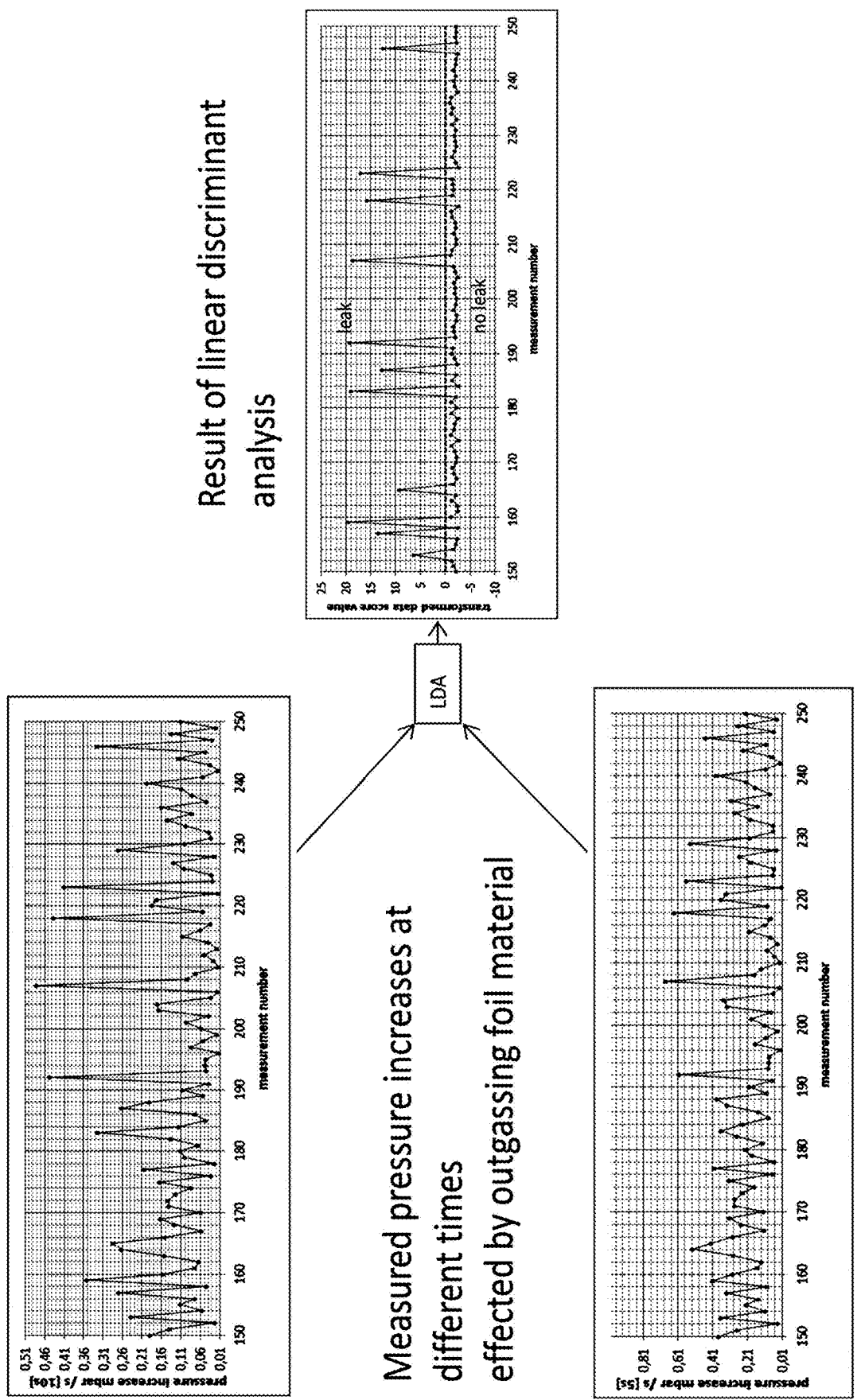
FIG. 10 show graphs exemplary measurements transformed by an LDA process.

EXAMPLE using LDA: FIG. 10 show graphs exemplary measurements transformed by an LDA process. On application of a pattern recognition process, transformed data score values representing leak or tight (no leak) can be determined, such as in the example of FIG. 10, by an LDA process. Here, each of the data points represents one leak test of a particular production package specimen. The graphs on the left side of the page show measured dp/dt (referred to herein interchangeably as "pressure increase") at two different times. The upper graph showing measured dp/dt at a first time, and the lower left graph showing measured dp/dt at a second time. Having already been trained, the LDA block takes both of the data from the left side of FIG. 10 (i.e. a pair of values, one value of dp/dt at a first time, and another value of dp/dt at a second time). Each measurement number typically represents a different specimen, e.g. a different production package being leak tested. The LDA block transforms each of the pairs of input dp/dt values into an absolute number, in the example of FIG. 10, ranging from −10 to +25. The threshold value in the example of FIG. 10 is about 0. LDA values generated from each pair of input values at or below 0 are defined as tight, those above 0 fail the measurement having been designated as leaking packages.

EXAMPLE—Leak Detection Device

FIG. 11 is a drawing showing an exemplary leak detection device according to the Application. The exemplary apparatus is the INFICON Contura S400™ available from the INFICON corporation of Switzerland, the assignee of this Application.

Software and/or firmware for instrument control (control of a vacuum pump, reading of a sensor, etc.) as well as data acquisition and pattern recognition (e.g. LDA) can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for leak detection of a test specimen comprising:
    providing an evacuable film test chamber having at least one wall area of a flexible material, said evacuable film test chamber operatively coupled to a pressure measuring device, and at least one or more processors operatively coupled to said pressure measuring device, said at least one or more processors programmed to control components of said evacuable film test chamber and to perform a pattern recognition process, and a specimen disposed within said evacuable film test chamber;
    evacuating said evacuable film test chamber;
    measuring a pressure within said evacuable film test chamber by said pressure measuring device at predetermined times during a measurement period of time;
    calculating by said at least one or more processors, a first or second order derivative of a pressure change at a first predetermined time, and a first or second order derivative of a pressure change at least at a second predetermined time during said measurement period of time, to provide at least a pair of derivative values; and
    categorizing by said at least one or more processors a leak state of said specimen under test by said pattern recognition process based on said pair of derivative values, as either a tight specimen which is substantially not leaking, or as a leaky specimen which is leaking.

2. The method of claim 1, wherein said step of calculating a derivative comprises a first derivative or slope at said first predetermined time and at said second predetermined time.

3. The method of claim 1, wherein said step of calculating a derivative comprises a second or higher order derivative of pressure change with time at said first predetermined time and at said second predetermined time.

4. The method of claim 1, wherein said step of measuring further comprises making a course leak detection measurement by measuring said pressure inside said evacuable film test chamber during a pump-off phase.

5. The method of claim 1, wherein said step of providing comprises providing said evacuable film test chamber having a gas-binding absorber material disposed within a volume connected to said evacuable film test chamber.

6. The method of claim 5, wherein said gas-binding absorber material comprises a zeolith.

7. The method of claim 5, wherein said gas-binding absorber material is disposed within a connecting channel between said evacuable film test chamber and said pressure measuring device.

8. The method of claim 7, further comprising a shut-off valve disposed in said connecting channel, said shut-off valve providing a selectable separation of said gas-binding absorber material from said volume of said evacuable film test chamber.

9. The method of claim 1, wherein said pattern recognition process comprises a recognition of points within a leaky region or a tight region of a graph space.

10. The method of claim 1, wherein said pattern recognition process comprises a linear discriminant analysis (LDA) process.

11. The method of claim 10, wherein at least one discriminant function is defined by a series of characteristic variables measured during a training or teach in series of measurements.

12. The method of claim 11, wherein said series of characteristic variables comprise a derivative of first or higher order of said pressure change with respect to time at said first and said second predetermined time.

* * * * *